United States Patent [19]

Bondioli

[11] Patent Number: 4,501,573
[45] Date of Patent: Feb. 26, 1985

[54] PROTECTION DEVICE FOR A UNIVERSAL JOINT

[76] Inventor: Edi Bondioli, Via Gina Bianchi 18, Suzzara, Italy

[21] Appl. No.: 395,719

[22] Filed: Jul. 6, 1982

[30] Foreign Application Priority Data

Jul. 14, 1981 [IT] Italy ................. 9474 A/81

[51] Int. Cl.³ ............................................. F16D 3/84
[52] U.S. Cl. .................................................. 464/172
[58] Field of Search ................. 74/609, 608; 464/171, 464/172

[56] References Cited

U.S. PATENT DOCUMENTS

| | | | |
|---|---|---|---|
| 2,696,089 | 7/1954 | Heth | 464/172 X |
| 2,772,550 | 12/1956 | Harrington | 464/172 X |
| 2,796,749 | 6/1957 | Warner | 464/172 X |
| 2,911,803 | 11/1959 | Weasler | 464/172 X |
| 2,953,000 | 9/1960 | Ressler et al. | 464/172 |
| 3,044,279 | 7/1962 | Atkinson | 464/172 X |
| 3,344,618 | 10/1967 | Young | 464/172 X |
| 3,498,082 | 3/1970 | Geisthoff et al. | 464/172 |
| 3,710,646 | 1/1973 | Bogan | 74/609 |

FOREIGN PATENT DOCUMENTS

| | | | |
|---|---|---|---|
| 1292839 | 3/1962 | France | 464/172 |
| 876593 | 9/1961 | United Kingdom | 464/172 |
| 1011521 | 12/1965 | United Kingdom | 74/609 |
| 1201573 | 12/1970 | United Kingdom | 74/609 |
| 2045396 | 10/1980 | United Kingdom | 74/609 |

*Primary Examiner*—Kenneth J. Dorner
*Assistant Examiner*—Rodney Lindsey
*Attorney, Agent, or Firm*—McGlew and Tuttle

[57] ABSTRACT

A protection device for the outer fork or bifurcated part of a universal joint at the coupling end of a Cardan shaft. A ring in at least two parts is arranged to be assembled on an annular support and seatings provided on the fork. A protection sleeve is mounted on the assembled ring in order to keep it in assembled condition and to be supported by it. Resilient tongues on the ring engage in slots in the protection sleeve in order to retain the sleeve on the ring.

4 Claims, 9 Drawing Figures

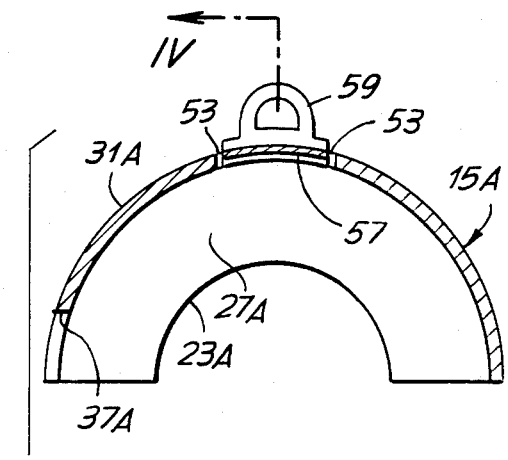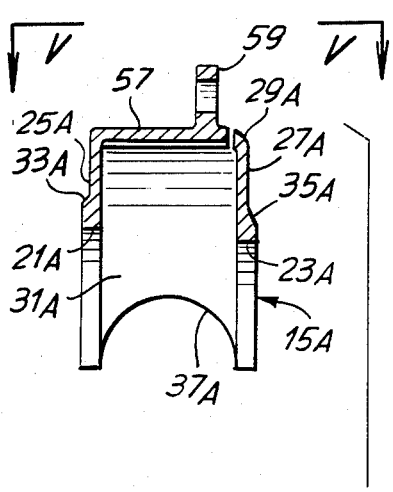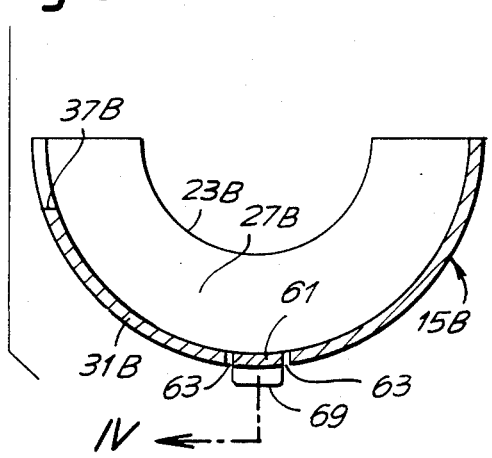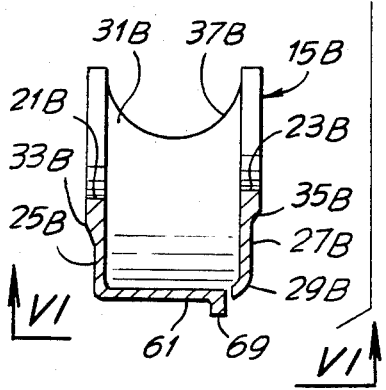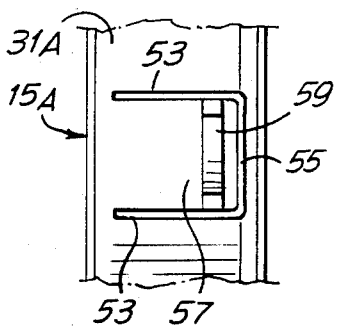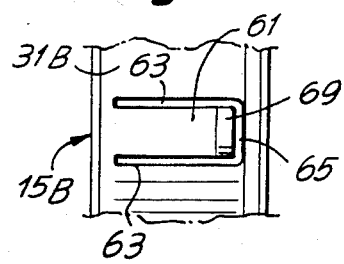

PROTECTION DEVICE FOR A UNIVERSAL JOINT

BACKGROUND OF THE INVENTION

1. Field of the Invention

This invention relates to a protection device for the outer fork of a universal joint.

2. Summary of the Prior Art

Universal joints are in extensive use in industry but have the disadvantage that they are liable severely to injure a person who comes into contact with the joint when in use, because of the irregular profile.

The object of the device is to ensure more or less complete protection of the rotating parts of a universal joint.

SUMMARY OF THE INVENTION

According to the present invention there is provided a protection device for the bifurcated part of a universal joint, said bifurcated part having two axially spaced annular seatings, a spliced coupling sleeve, retaining means co-operating with said sleeve to retain the sleeve on an associated shaft, a first ring part, a second ring part, said ring parts being arranged, when assembled together, to be mounted on the seatings of the bifurcated part, protection sleeve means mounted on the assembled ring parts, and means serving to maintain the protection sleeve on the ring.

Preferably the ring parts are of U section or more broadly stated such as to form two annular, spaced-apart, sliding contact surfaces.

The restraining means may comprise on one side at least one slot in the protective sleeve and on the other side a yieldable snap-action projection formed in the ring by means of cuts and projections, in order to penetrate into the slot. The slot may extend in the form of a circumferential arc to allow angular movements between two positions of the ring relative to the sleeve. The ring may comprise a peripheral surface of revolution which substantially mates with another corresponding surface of the sleeve, and the two surfaces comprise apertures which are offset in one of the two positions, and coincide in the other position to allow internal access. In practice, the sleeve has a slot with an intermediate stop projection, for example a saw tooth, and the ring a resilient tongue cooperating with said projection to define the two positions, movement from one of the latter being possible only by a specific action by an operator.

An eyelet coupled to a locking chain for preventing rotation of the protection sleeve may be provided on the resilient tongue.

BRIEF DESCRIPTION OF THE DRAWINGS

FIG. 3 is a section through the two parts of the ring taken on a plane perpendicular to the axis of rotation;

FIG. 4 is a section on the line IV—IV of FIG. 3;

FIGS. 5 and 6 are detailed views of said two parts of the ring taken from above and below on the lines V—V and VI—VI of FIG. 4 respectively;

DESCRIPTION OF THE PREFERRED EMBODIMENTS

Figure 2:
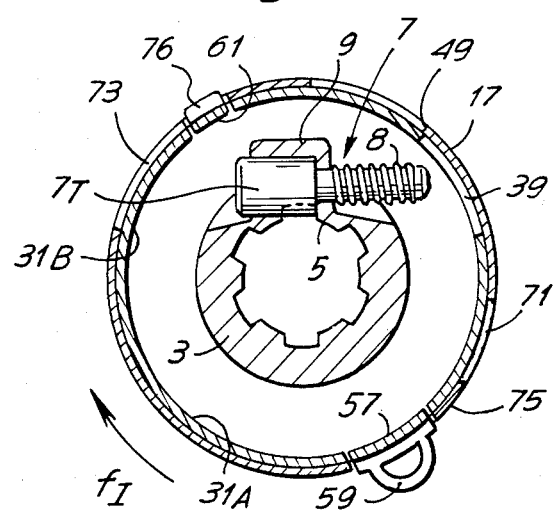
FIG. 2 is a section on the line II—II of FIG. 1.
Figure 7:
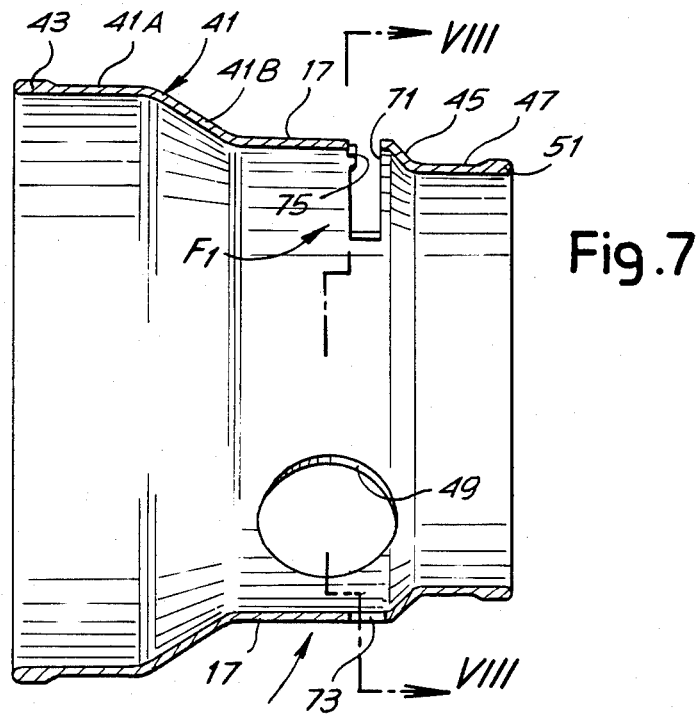
FIG. 7 is a section through the protection sleeve on a plane passing through the axis of rotation.
Figure 8:
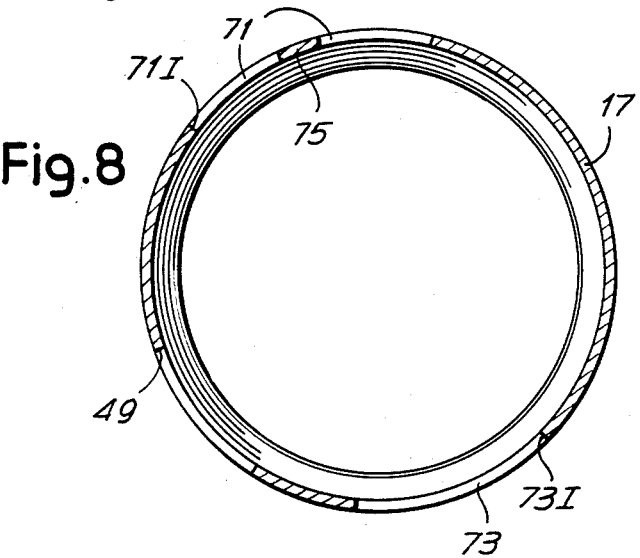
FIG. 8 is a section on the line VIII—VIII of FIG. 7.
Figure 9:
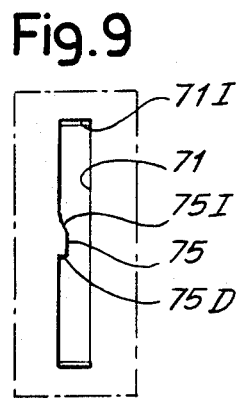
FIG. 9 is a plan view of the detail F1 of FIG. 7.

The purpose of the protection device in accordance with the invention is to cover the fork 1 or bifurcated part of a universal joint (sometimes known as a Hooke's joint or Cardan joint) in order to prevent accidents, the fork being coupled to one end of the conventionally splined shaft by its own coupling sleeve portion 3, which also conventionally comprises a splined profile 5 as shown in FIG. 2. This sleeve 3 is mounted on an end portion of the shaft and so secured that it cannot be withdrawn therefrom, by means of a tangential restraining key 7 which can slide, against the action of a return spring 8, in a bore of projection 9 of the sleeve. The cylindrical head 7T of the key engages in a corresponding transverse groove in a rib of the shaft end portion and extends inwardly in the sleeve 3 through an opening. As can be seen in FIG. 2, the transverse groove interrupts one or more ribs of the splined shaft end portion. The fork 1 can however be secured and coupled to the shaft end portion in any other known manner, provided however that there is included the restraining means similar to the key 7 which can be easily inserted or withdrawn for disengaging the fork 1 from the shaft end portion.

On the wall of the sleeve 3 seatings 11 and 13 are provided for a ring 15 comprising at least two parts 15A and 15B, which, when their edges thereof are applied to the seatings mate with each other so as to define the complete ring 15. When the protection device in accordance with the invention has been mounted, the ring 15 is maintained assembled by an intermediate portion 17 of a generally tapering protection sleeve 19 mounted on the ring, by which it is thus supported. One of the seatings 11 and 13 is of larger diameter than the other, so as to ensure that the two parts of the ring 15 are mounted in their correct location to allow subsequent mounting of the sleeve 19 thereon.

Figure 1:
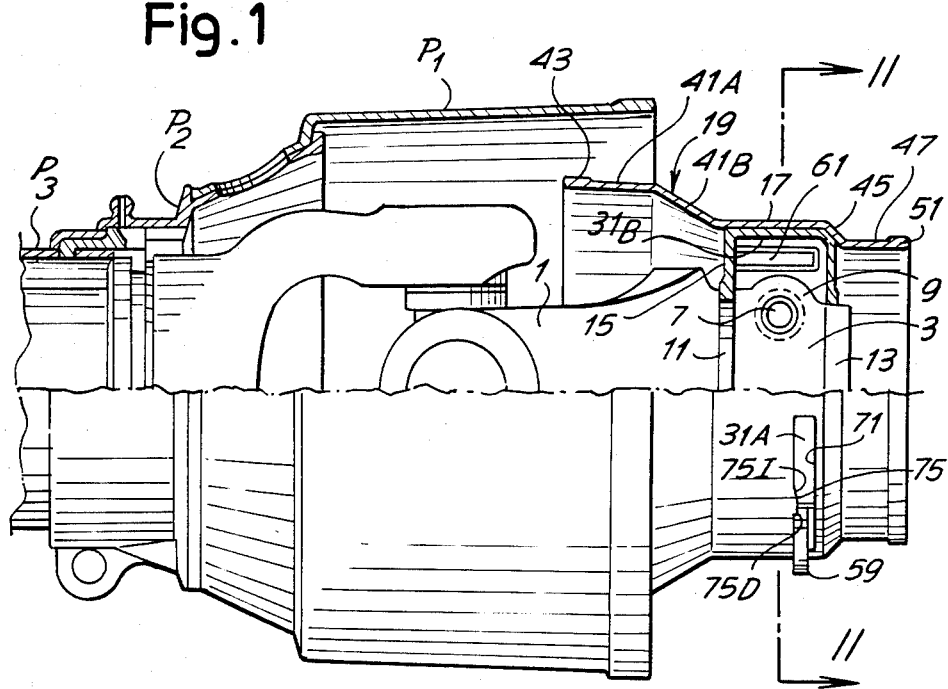
FIG. 1 is a partly sectional side view of the protection device according to the invention.

As shown in FIGS. 2, 3, 4, 5 and 6, the two parts 15A and 15B of the ring 15 comprise concave annular edges 21A, 21B and 23A, 23B arranged to engage the seatings 11 and 13 of the sleeve 3, generally plane side walls 25A, 25B and 27A, 27B radially outwardly of the respective annular edges 21A, 21B and 23A, 23B, chamfers 29A, 29B extending between the walls 27A and 27B and a wall 31A, 31B shown semi-cylindrical in FIG. 3 and about which the portion 17 of the sleeve 19 lies as shown in FIG. 1. The two half rings 15A and 15B are thus of U section, with their concavity facing the coupling sleeve 3. The side walls 25A, 25B and 27A, 27B are of greater thickness at the zones adjacent the annular edges 21A, 21B and 23A, 23B, and become thinner outwardly at bevels 33A, 33B and 35A, 35B.

The semi-cylindrical walls 31A, 31B comprise recesses 37A and 37B which match together when the two parts of the ring 15 are assembled, in order to form an approximately circular hole 39 (FIG. 2) through which the key 7 can be operated from the outside when an aperture 49 in the sleeve 19 is made to correspond with the hole 39, as described hereinafter.

The tapering protection sleeve 19 is so shaped that, together with a further protection covering P1, P2, P3 for the Cardan transmission shaft coupled to the fork 1, it provides maximum protection against operators or their clothing making accidental contact with the fork or with the shaft end portion to which it is coupled, while at the same time allowing satisfactory operation of the universal joint of which the protection sleeve forms part. In addition to the portion 17, the sleeve 19 includes a portion 41 of frusto-conical form, of which a front portion 41A has slight conicity, whereas a portion 41B connecting the zone 17 has a more pronounced conicity. An annular stiffening rib 43, of greater thickness, extends around the end opening of the portion 41A. The portion 17 is connected by an annular bevel 45 to an approximately cylindrical zone 47 of smaller diameter, which also terminates in an annular stiffening rib 51. When assembled the bevel 45 is in contact with the chamfers 29A, 29B of the two parts 15A, 15B of the ring 15.

In order to make the tapering protection sleeve 19 even more securely mounted on the ring 15, the half ring 15A comprises (FIGS. 3, 4, 5) a resilient tongue 57 and an orthogonal projection 59 formed as an eyelet and having a semi-circular contour. The eyelet has an opening. The tongue 57 is defined in the cylindrical wall 31A by opposing, parallel, cuts 53 and by a transverse cut 55, and is thus free to flex inwards. Similarly (FIGS. 3, 4, 6) the half ring 15B comprises, at a position opposite to the tongue 57, a tongue 61 defined in the wall 31B by opposing, parallel, cuts 63 and a transverse cut 65. A tooth-like projection 69 extends outwardly and orthogonally relative to the tongue 61.

The two parts 15A and 15B of the ring 15 are constructed primarily of plastics material having excellent resilience characteristics, so that on mounting the tapering projection sleeve 19 on to the ring 15, the tongues 57 and 61 can be bent inwards until the projections 59 and 69 take up dispositions where they lie below the general profile of the associated parts. When mounting is complete, the projections 59 and 69 are able, because of the resilience of the tongues 57 and 61 to again project outwards owing to the presence of corresponding slots 71 and 73 in the portion 17 of the protection sleeve.

As can be seen from FIGS. 1 and 2, the protection sleeve 19 is secured to the ring 15 in the axial direction by virtue of the insertion of the projections 59 and 69 into the corresponding slots 71 and 73, these projections preventing sliding to the right as shown in the drawing, and maintaining the bevel 45 in contact with the bevels 29A and 29B of the two parts of the ring 15. The ring is also kept assembled because it is housed without clearance inside the portion 17.

As can be seen from FIGS. 2, 7, 8 and 9, the slots 71 and 73 extend angularly along the periphery of the portion 17, and they thus enable the protection sleeve 19 to rotate through a certain angle relative to the ring 15 while remaining engaged with it because the projections 59 and 69 can slide in the slots. The angular portion of the hole 39 in the ring 15 relative to the projections 59 and 69, and the angular position of the aperture 49 in the sleeve 19 relative to the initial ends 71I and 73I of the slots 71 and 73 are determined such that when the projections 59 and 69 are touching these ends 71I and 73I, the hole 39 and aperture 49 are offset so that the hole 39 becomes restricted by a portion of the inner surface of the portion 17. When, however, the sleeve 19 is rotated in the direction of the arrow f1 (FIG. 2) until the projections 59 and 69 reach the respective other ends of the slots, the aperture 49 becomes approximately aligned with the hole 39, with the result that the operator has access to the interior of the protection device to enable the key 7 to be operated.

As can be seen from FIGS. 2, 7, 8, 9, one of the edges of the slot 71 comprises in a central position a profiled projection 75 which has to be over-ridden by the projection 59 in order to pass from one to the other of the end positions in the slot 71. The projection 75 is shaped on one side with an inclined lead surface 75I, whereas on the other side it is bounded by a right angled wall, thus having a saw tooth configuration 75D. When, by virtue of the rotation of the protection sleeve 19, the projection 59 has passed beyond this right-angled wall 75D, spontaneous rotation of the sleeve in the opposite sense cannot occur. By virtue of the presence of the projection 75, the sleeve 19 can thus assume two positions in which the projection 59 is disposed in one or other of the two parts of the slot 71 separated by said projection 75, namely a first position in which the hole 39 and aperture 49 are approximately aligned and in which the projection 59 lies on the same side of the projection 75 as the inclined lead surface, and a second position in which the projection 59 is on the tooth side of the projection 75, in which the hole 39 and aperture 49 are offset. The projection 59 is so disposed on the tongue 57 that it adheres to that edge of the slot 71 comprising the projection 75. Although the projection 59 is able to overcome the inclined surface 75I of the projection owing to the resilience of the tongue 57, in order to over-ride the tooth portion 75D, the tongue 57 must be deformed manually inwards towards the other edge of the slot 71.

The purpose of the eyelet opening in the projection 59 is to allow connection to the end of a chain which at its other end is connected to a fixed connection element on an associated machine in order to prevent the protection device in accordance with the invention from being caused to rotate by friction between the seatings 11 and 13 of the sleeve 3 and the annular edges 21A, 21B and 23A, 23B of the two parts of the ring 15.

The manner of use, operation, and assembly already partly described, of the protection device according to the invention will now be reviewed. To assemble the device, the two parts 15A and 15B of the ring 15 are disposed on the seatings 11 and 13 of the sleeve 3 of the fork 1, and the protection sleeve 19 is mounted on the ring 15, the ring 15 being formed so that it becomes housed in the portion 17 of the sleeve 19. The tapering sleeve 19 must also be disposed such that the projections 59 and 69, which must initially be pressed inwards until they disappear below profile of the surrounding parts and then snap through the slots 71 and 73 respectively. By moving the sleeve 19 into the position in which the hole 39 and aperture 49 are approximately aligned, access is gained to the interior of the protection device, and then the tangential key 7 can be operated against the action of the return-spring 8, in order to mount the sleeve 3 on the shaft and lock it with the key 7. When the sleeve 3 has been locked on the shaft, the hole 39 is closed by rotating the protection sleeve 19 in the opposite sense to the arrow f1 of FIG. 2, so that the projection 59 passes from its position in the slot 71 adjacent to the inclined part 75I of the projection 75, to a position in which the projection is blocked by the tooth-shaped part 75D of the projection, in order to prevent the sleeve 19 from being able to rotate accidentally in the reverse sense.

The dismantling procedure is the opposite to that described for assembly. The projection 59 is pressed in order to release it from the projection 75, and the sleeve 19 is rotated in the sense of the arrow f1 of FIG. 2, in order to make the hole 39 and aperture 49 approximately coincide. The tangential key 7 is then operated so that its head becomes disengaged from the corresponding transverse cavity in the splined shaft. The Cardan shaft can now be removed, complete with the protection device.

The drawing shows only one embodiment given solely as a practical construction of the invention, which can be varied in shape and arrangement without departing from the scope of the appended claims.

I claim:

1. In a protection device for a universal joint, comprising a bifurcated part, said bifurcated part having two axially spaced annular seatings,
    a splined coupling sleeve portion,
    retaining means co-operating with said sleeve portion to retain said sleeve portion on an associated shaft,
    a first ring part,
    a second ring part,
    said ring parts, when assembled together, being mounted on said seatings of said bifurcated part to form assembled ring parts,
    protection sleeve means mounted on the assembled ring parts,
    means serving to maintain the protection sleeve on said assembled ring parts, said means serving to maintain the protection sleeve on said assembled ring parts comprising means defining a slot in said protection sleeve and a resilient snap-action tongue formed in said assembled ring parts and capable of penetrating the slot,
    said slot in the protection sleeve being of arcuate form and allowing the tongue of the ring to make relative angular movements between extreme positions, wherein said assembled sleeve and ring parts each define a peripheral surface of revolution which mate with each other, the two surfaces having respective apertures which are aligned in one relative location of the tongue in the slot and are offset in another relative location of the tongue in the slot.

2. A device according to claim 1, wherein the slot of the protection sleeve has a projecting stop and the resilient snap-action tongue co-operates with the stop to define the said extreme positions.

3. A device according to claim 2 wherein the tongue has an eyelet receiving a lock chain to prevent relative rotation of said assembled ring parts.

4. In a universal joint,
    an internally-splined sleeve for coupling the joint to a splined end portion of a shaft,
    means on the sleeve defining two, axially-spaced, annular seatings,
    a first ring part of semi-annular form and of U-section having side walls with internal arcuate edges with the opening of the U facing inwardly and with the internal arcuate edges of the side walls of the U engaging in respective said seatings,
    a second ring part of semi-annular form and of U-section having side walls with internal arcuate edges with the opening of the U facing inwardly and with the internal arcuate edges of the side walls of the U engaging in respective said seatings,
    said ring parts forming together a complete ring and defining a peripheral annular surface,
    each said ring part having
        an axially-extending resilient tongue with an upstanding projection at the free end, and
        a tapering, protection sleeve including a portion complementary to said peripheral annular surface and having two arcuate circumferential slots engageable by the respective projections of the resilient tongues to limit relative angular motion between the projection sleeve and the ring.

* * * * *